United States Patent Office 3,706,795
Patented Dec. 19, 1972

3,706,795
CONVERSION OF 2,2-BIS(FLUOROPERHALO-METHYL)-3,4-DIFLUOROOXETENE TO THE CORRESPONDING FLUOROPERHALO - 3-METHYL-2-BUTENOYL FLUORIDE
Bernard M. Lichstein, Elizabeth, and Cyril Woolf, Morristown, N.J., assignors to Allied Chemical Corporation, New York, N.Y.
No Drawing. Continuation-in-part of application Ser. No. 600,047, Dec. 8, 1966. This application Aug. 18, 1969, Ser. No. 851,043
Int. Cl. C07c 51/58, 57/02, 69/52
U.S. Cl. 260—544 F                                5 Claims

ABSTRACT OF THE DISCLOSURE 2,2-bis(fluoroperhalomethyl) - 3,4-difluorooxetenes can be converted in the presence of a free radical initiator, such as iodine, to the corresponding fluoroperhalo-3-methyl-2-butenoyl fluorides, which are useful as intermediates in the preparation of surfactants and other useful compounds.

CROSS-REFERENCE TO RELATED APPLICATION

This application is a continuation-in-part of copending application Ser. No. 600,047, filed Dec. 8, 1966, now abandoned.

BACKGROUND OF THE INVENTION

This invention relates to novel unsaturated polyfluorinated carbonyl compositions and to methods for their preparation.

U.S. Pat. 3,362,963 to Woolf et al. discloses 2,2-bis-(fluoroperhalomethyl)-3,4-difluorooxetenes of the formula

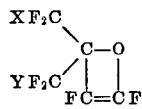

wherein X and Y are independently chlorine or fluorine. These oxetenes are useful as intermediates in the preparation of various surface-active agents, solvents and plasticizers.

It is an object of this invention to convert these oxetenes to novel compounds which are also useful as intermediates in the preparation of various other useful compounds.

SUMMARY OF THE INVENTION

We have found that 2,2-bis(fluoroperhalomethyl)-3,4-difluorooxetenes having the formula

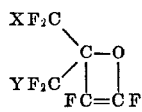

wherein X and Y are independently chlorine or fluorine are converted in the presence of a free radical initiator to the corresponding fluoroperhalo-3-methyl-2-butenoyl fluorides having the formula

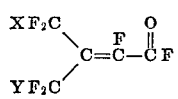

wherein X and Y have the meanings given above. This result is surprising since one would normally expect the oxetene to polymerize in the presence of a free radical initiator.

The reaction product is valuable as an intermediate in the preparation of low surface energy compounds, such as surfactants, oil- and water-repellents, etc. Its value lies in the fact that it has a "tail" consisting of two fluoromethyl groups, which are notoriously hydrophobic and oleophobic, and a "head" consisting of the very reactive acid fluoride group. Because perfluorinated compounds have especially low surface energy, X and Y are preferably fluorine.

Because of the reactivity of the acid fluoride group, the compound can be used to prepare many useful products. for example, the compound reacts with perfluoroethylene to form the corresponding oxetane. Oxetanes, being the subject of several patents, are known to be useful compounds and this invention can be utilized as a step in a process for successively extending the chain length of oxetanes.

The conversion can be carried out either in the presence of the initiator alone or additionally in the presence of an inert solvent. Inert solvents which are particularly suitable for use in this invention include fluoroalkanes, such as perfluoroethane, perfluoro-n-propane, perfluoroisopropane, perfluoro-n-butane, perfluoro-n-hexane, perfluorocyclohexane, and the like.

Any of a wide variety of free radical initiators may be employed in practicing the process of the present invention, including chemical initiators as well as radiant energy, e.g. ultraviolet irradiation and thermal energy. Suitable chemical initiators include iodine, organic and inorganic peroxy compounds including diacyl peroxides such as benzoyl peroxide, diacetyl peroxide and lauroyl peroxide; alkyl peroxides such as diethyl peroxide and t-butyl hydroperoxide; inorganic peroxides such as hydrogen peroxide; salts of peracids such as ammonium persulfate, sodium perborate, potassium percarbonate; ozone and the like. Azo compounds are also known chemical free radical initiators including carbamylazoisobutyronitrile, α,α'-azodiisobutyronitrile,  α,α'-azobis(α,γ-dimethylvaleronitrile), α,α'-azobis(α,γ-dimethyl - γ - methoxyvaleronitrile), 1,1'-azodiisobutyramide, dimethyl-α,α-azodiisobutyrate and the like. Iodine is preferred. When a chemical initiator is employed, at least about 0.1 percent by weight of initiator based on the weight of oxetene is required in our process for a good yield of the desired product.

The temperature required for the reaction to take place is dependent somewhat upon the reactivity of the initiator employed. Generally temperatures of from about 40° C. up to about 140° C. are suitable. Using iodine as the initiator, advantageous results are obtained when temperatures of from about 60° C. up to about 125° C. are employed. The optimum temperature can be determined by test runs for each system.

The product can be isolated from unreacted starting material, excess solvent and the like in any convenient manner such as by fractional distillation.

Being an acid fluoride, the reaction product can be converted to other acyl derivatives, which are also novel compounds, in accordance with conventional methods. For example, the acid fluoride readily hydrolyzes to the free acid. Accordingly, if the free acid is not desired, water should be excluded from the reaction. Esters can be prepared directly by carrying out the reaction in the presence of an ether, which can also serve as a solvent. When nonsymmetrical ethers are employed, mixtures of esters are obtained which can be separated by conventional means, such as by fractional distillation. Preferably, an excess of ether is employed. Ethers suitable for use in the present invention include saturated aliphatic ethers, such as dimethyl ether, methyl ethyl ether, diethyl ether, di-n-propyl ether, diisopropyl ether, methyl-n-butyl ether, ethyl-n-butyl ether, di-n-butyl ether, di-n-amyl, diisoamyl ether, di-n-hexyl ether, dicyclohexyl ether and the like; alicyclic ethers such as tetrahydrofuran and the like;

aromatic ethers such as diphenyl ether, anisole, phenetole, n-butyl phenyl ether, n-amyl phenyl ether, ethyl benzyl ether, the methyl tolyl ethers, the ethyl tolyl ethers and the like; and halogenated ethers such as s-di-(chloromethyl) ether; α,β-dichloroethyl ethyl ether, di-(β-chloroethyl) ether, bromo-n-propyl phenyl ether, 3,3′-dichlorodiphenyl ether, γ,γ′-dichloro-di-n-propyl ether and the like. The resultant ester group, therefore, can be represented as "—OR" wherein R is lower alkyl, phenyl, lower alkyl substituted phenyl, or any of these containing one or more halogen substituents. The esters generally have the same utility as the corresponding acid fluorides, except, of course, for the diminished reactivity of the acyl group. For example, unlike the acid fluoride, the ester does not react with perfluoroethylene.

The products of this invention can be fluorinated to prepare the corresponding saturated, perfluorinated acyl rerivatives, which are useful as surfactants and as oil- and water-repellent agents.

The invention is further illustrated by the following examples, wherein all parts are by weight.

Example 1

100 parts of 2,2 - bis(trifluoromethyl) - 3,4 - difluorooxetene and 157 parts of iodine were charged to a glass pressure bottle which had been previously dried and filled with nitrogen. The bottle was fitted with a magnetic stirrer and the mixture was stirred for 2 hours at room temperature. The bottle was immersed in a controlled oil bath and the temperature raised to 117° C. over a 2-hour period when the pressure in the bottle reached 105 p.s.i.g. After 20 hours at 117° C., the flask was cooled to room temperature and the contents distilled through two traps, under vacuum. The first trap maintained at —80° C. and the second trap was maintained at —196° C. The contents of the —80° C. trap were redistilled at —78° C. and atmospheric pressure.

Perfluoro-3-methyl - 2 - butenoyl fluoride was obtained in 71%, by weight, yield. Its structure was confirmed by infrared and nuclear magnetic resonance analyses. The product had a boiling point of 40° C.

The results of elemental analysis were as follows.—Calculated for $C_5F_8O$ (percent): C, 26.34; H, 0.0; F, 66.67. Found (percent): C, 26.68; H, 0.18; F, 66.4.

Example 2

100 parts of 2,2-bis(trifluoromethyl)-3,4-difluoro-oxetene, 143 parts of iodine and 365 parts of anhydrous ether were charged to a flask as in Example 1 and stirred at room temperature for 17 hours. No reaction was apparent. The flask was immersed in a controlled hot oil bath at 72° C. and the temperature increased to 117° C. over a 5-hour period. The pressure reached 79 p.s.i.g. After 17 hours at 117° C., the product was distilled through two traps, the first at —80° C. and the second at —196° C. The contents of the first trap were shaken with mercury to remove iodine and filtered. The filtrate was distilled and a product having a boiling point of 112° C. was obtained in 84% by weight yield.

The product was confirmed as ethyl perfluoro-3-methyl-2-butenoate by infrared and nuclear magnetic resonance analyses.

Elemental analysis was as follows.—Calculated for $C_7H_5F_7O$ (percent): C, 33.1; H, 1.97; F, 52.4. Found (percent): C, 31.6; H, 1.96; F, 52.8.

Example 3

The procedure as in Example 2 is followed substituting methylethyl ether as solvent. A mixture of esters is obtained which are separated by fractional distillation. The products are ethyl perfluoro-3-methyl-2-butenoate and methyl perfluoro-3-methyl-2-butenoate.

Example 4

The procedure as in Example 1 is followed except 2,2-bis(chlorodifluoromethyl) - 3,4 - difluorooxetene is employed as the reactant. The product obtained is 4-chloro-4,4-difluoro - 3 - chlorodifluoromethyl - 2 - fluoro - 2-butenoyl fluoride.

Example 5

The procedure of Example 2 is followed using 2,2-bis(chlorodifluoromethyl) - 3,4 - difluorooxtene as the reactant. The product obtained is ethyl 4-chloro-4,4-difluoro-3-chlorodifluoromethyl-2-fluoro-2-butenoate.

We claim:
1. A process for preparing compounds having the formula

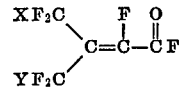

wherein X and Y are independently chlorine or fluorine, which comprises reacting a 2,2-bis(fluoroperhalomethyl)-3,4-difluorooxetene having the formula

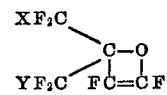

wherein X and Y are as defined above at a temperature of from about 40° C. to about 140° C. in the presence of iodine.

2. The process of claim 1 wherein the temperature is from about 60° C. to about 125° C.

3. The process of claim 2 wherein the oxetene is 2,2-bis(trifluoromethyl)-3,4-difluorooxetene.

4. A compound having the formula

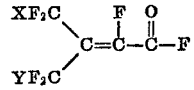

wherein X and Y are independently fluorine or chlorine.

5. The compound of claim 4 wherein X and Y are fluorine.

References Cited

Knunyants et al.: Chem. Abstracts, vol. 55, p. 20903g (1961).

Knunyants et al.: Chem. Abstracts, vol. 55, pp. 16412–3(i) (1961).

LORRAINE A. WEINBERGER, Primary Examiner

R. D. KELLY, Assistant Examiner

U.S. Cl X.R.

204—158 R; 260—479 S, 486 H, 539 R